United States Patent Office — 3,385,168 — Patented May 28, 1968

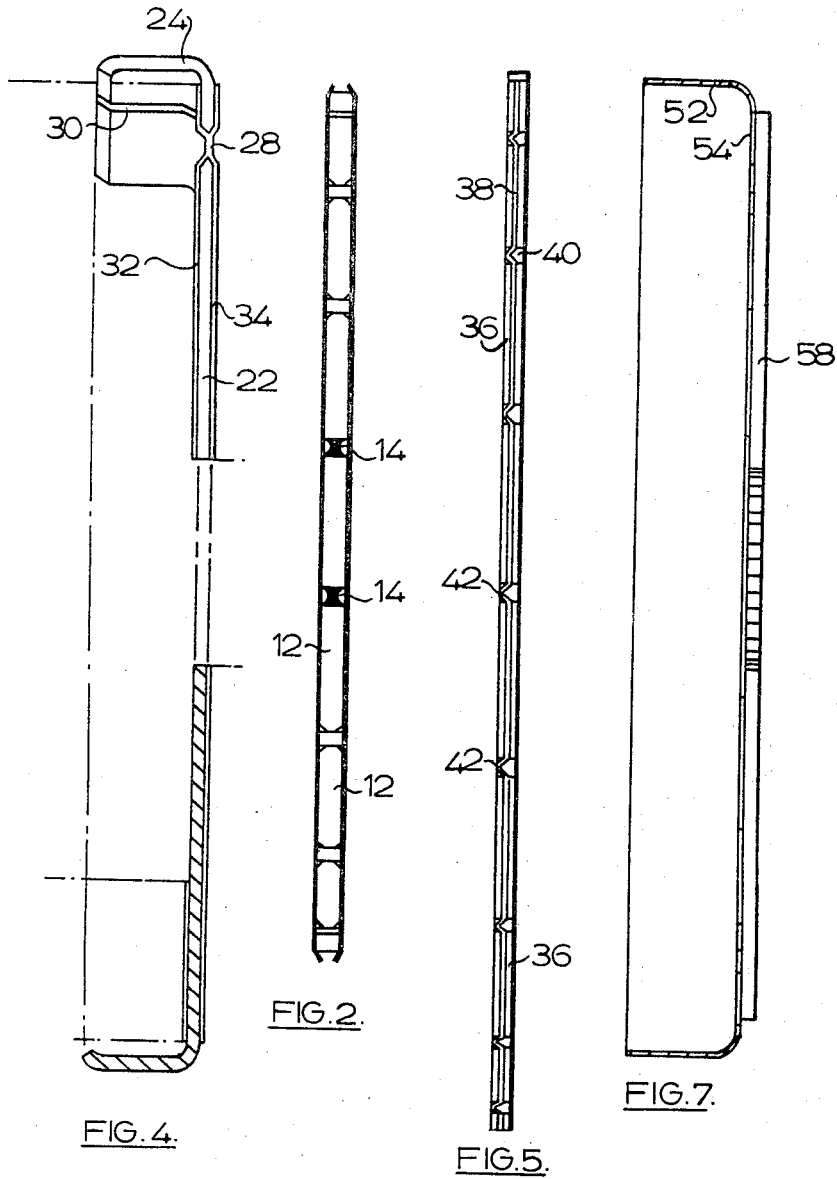

1

3,385,168
DIFFERENTIAL PRESSURE OPERATED
BOOSTERS
Harold Fineman, Moseley, Thomas G. Lawson, Sheldon, and Reginald M. Bowmer, Kingsheath, Birmingham, England, assignors to Girling Limited, Tyseley, Birmingham, England
Filed Mar. 28, 1966, Ser. No. 537,841
Claims priority, application Great Britain, Mar. 30, 1965, 13,344/65
6 Claims. (Cl. 91—369)

ABSTRACT OF THE DISCLOSURE

For use in differential pressure operated booster a deformable annular plate structure for applying a force against an operator's foot to provide feel, the plate comprising a composite structure of a pair of identical sheets of plastic or the like in face to face relationship and radially joined together along circumferentially spaced lines to provide pockets for the insertion of individual fingers, the slots simultaneously maintaining the fingers in circularly spaced and radially fixed relationship thereby defining a radially slotted annular plate.

This invention concerns differential pressure operated boosters, especially for vehicle braking systems, and of the kind in which a load-actuating member is displaceable by the application of differential fluid pressures to a movable wall.

Systems employing such boosters usually function under the control of a valve which is arranged to alter the pressure on one side of the movable wall relative to that on the other side, and it is recognised that it is desirable to provide on the operating member of the valve, a reaction which the operator can sense and which is proportional to the degree of pressure differential established between the two sides of the wall. In a vehicle braking system, for example, the operator then experiences the "feel" of the brakes, which assists him to control the extent to which they are applied.

One convenient way of providing the required reaction or feel is to arrange for the movable wall to be deformed conically or to dish responsive to the pressure differential when the booster is energised and to transmit the reaction resulting from this deformation back to the operator. For this purpose, it has already been proposed to construct the movable wall as an annular elastic diaphragm which is radially and circumferentially supported by a so-called deflecting plate formed with radial slots to enable it to dish or cone, or to deflect, responsive to differential pressures on its two sides.

According to the present invention, a deflecting plate for a differential pressure operated booster comprises a plurality of rigid, individual radial fingers carried in mutually flexing relation by support means which simultaneously maintains said fingers in regularly circularly spaced and radially fixed locations thereby to define a radially slotted annular plate.

The support means may, for example, be a flexible sheet of a material such as nylon to one or both sides of which the rigid fingers, themselves of metal or a rigid synthetic resin, are welded or bonded, or alternatively the fingers may be sandwiched between a pair of such sheets, or may be located in pockets formed in a tailored fabric or flexible synthetic resin support. Alternatively, however, the support means is a cylindrical sleeve having a plurality of regularly spaced radially inwardly directed tabs or lugs at one end and each having a rigid radial finger welded or bonded thereto.

2

Figure 1:
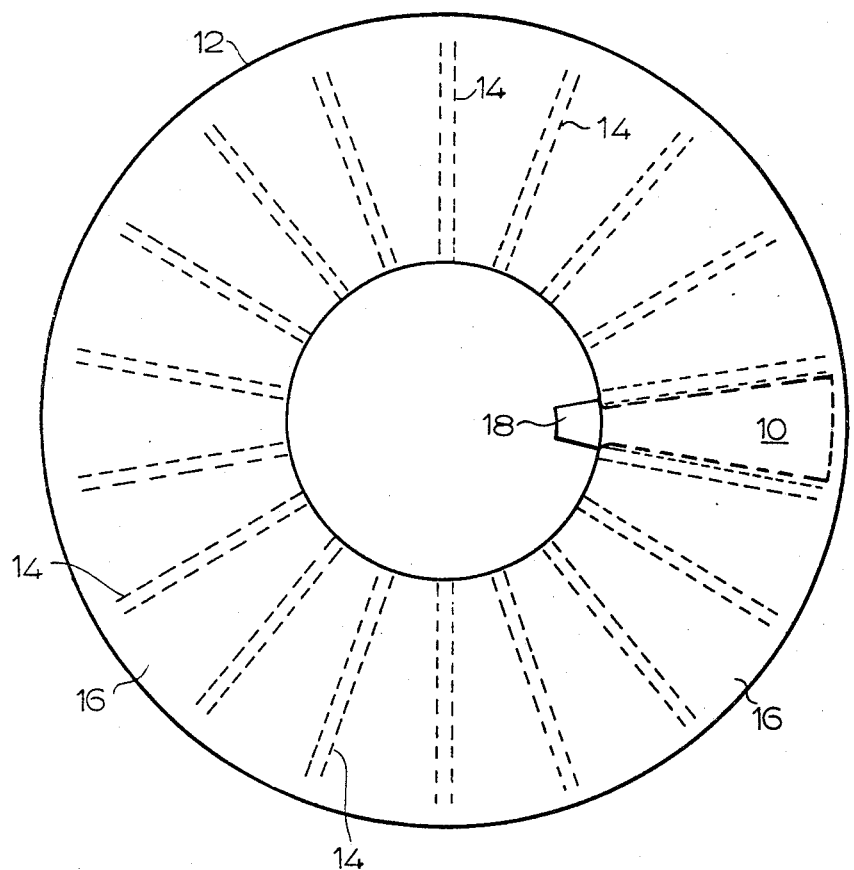
Figure 6:
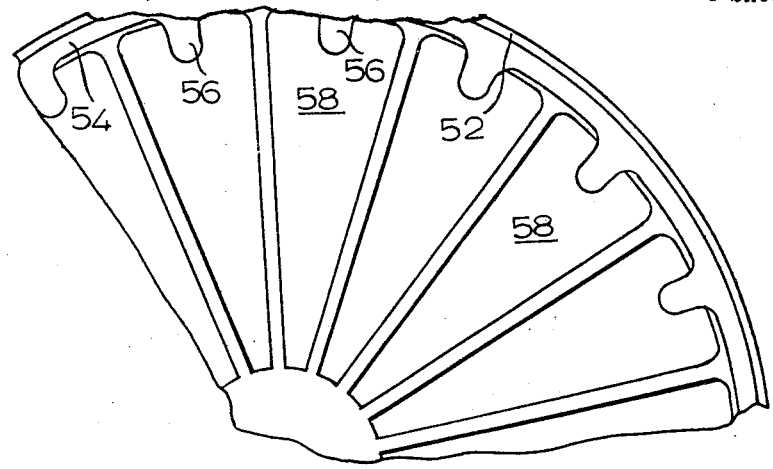
Figure 3:
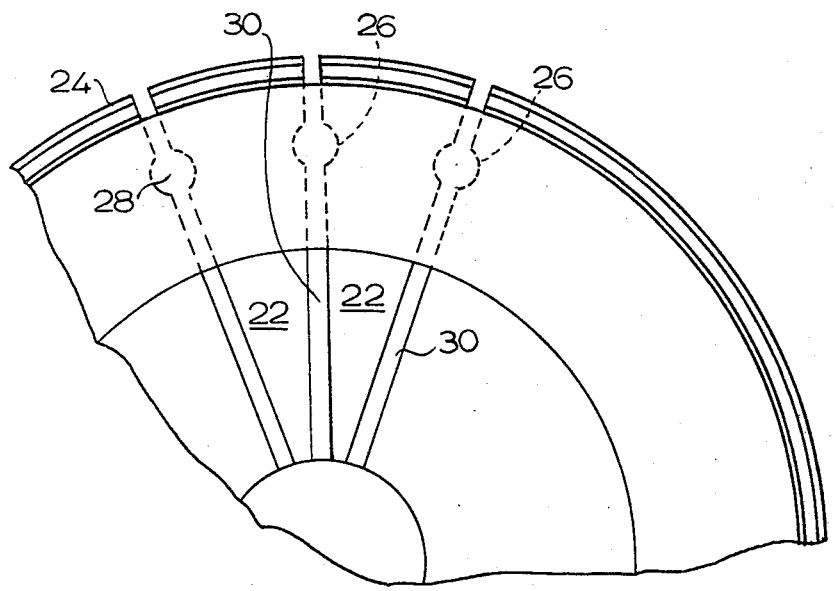
Figure 8:
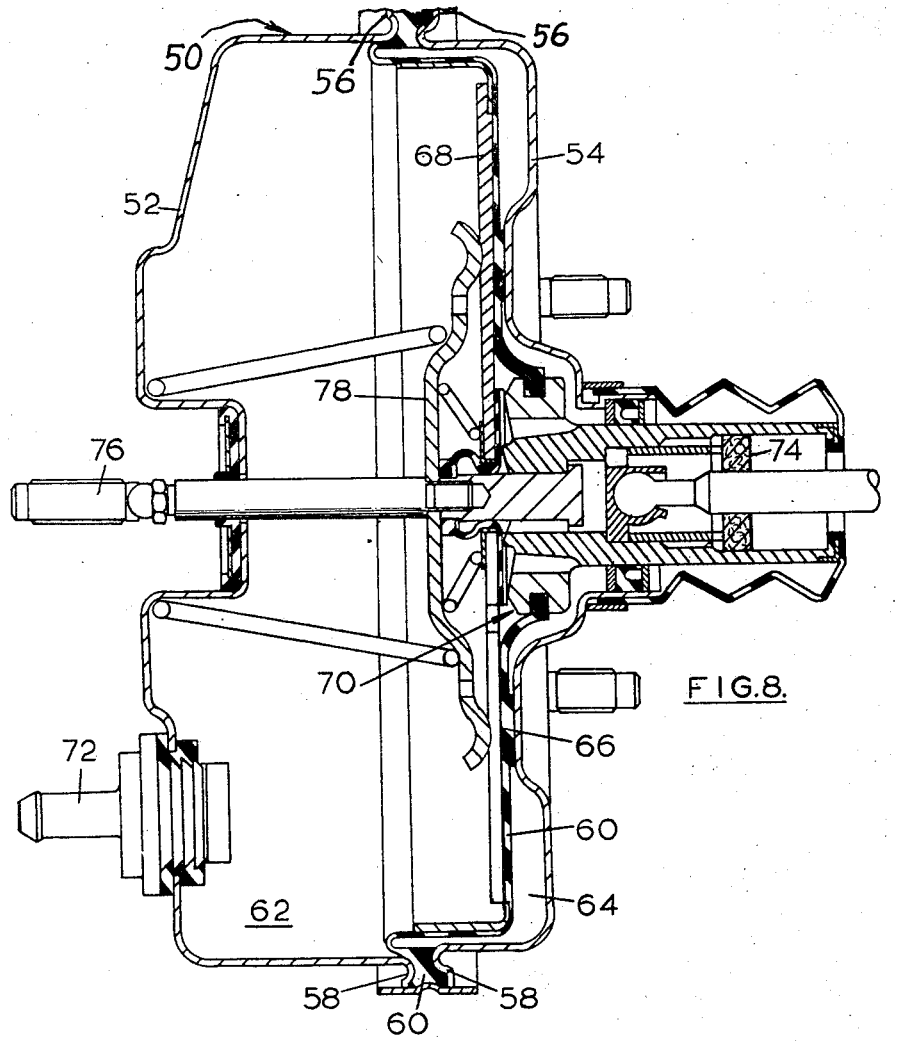

The invention will be described further, by way of example, with reference to the accompanying drawings, in which:

FIG. 1 is a front elevation of a deflecting plate embodying the invention,
FIG. 2 is an end elevation thereof,
FIG. 3 is a front elevation of a part of a modification of the embodiment of FIG. 1,
FIG. 4 is an end elevation of the embodiment shown in FIG. 3,
FIG. 5 is an end elevation of a further modification of the invention,
FIG. 6 is a front elevation of a part of another construction of deflecting plate according to the invention,
FIG. 7 is an end elevation of the construction illustrated in FIG. 6, and
FIG. 8 is a section, taken on two mutually inclined axial planes, through a servomotor or booster including a deflecting plate according to the invention.

In the deflecting plate shown in FIGS. 1 and 2, a plurality of rigid metal or plastic fingers 10 are arranged radially and in regularly circularly spaced relation in pockets 16 defined by forming radial welds 14 between two identical annular sheets 12 of a plastic material such as nylon. In will be noted that the fingers 10 are of radially outwardly divergent shape and that at their inner ends they are provided with quasi-barbed heads 18, the divergent shape and the barbed heads serving to maintain the fingers in their proper radial positions while the pockets 16 preserve their circumferential spacing. In order to simplify the introduction of the fingers 10 into the pockets 16 during assembly of the plate, the welds are not taken to the full radial extent of the sheets 12 but stop short of the periphery of those sheets, thereby to present open mouths to the pockets.

In the modification of the invention illustrated in FIGS. 3 and 4, radial fingers 22 are provided with axially directed outer flanges 24 which cause the completed deflection plate to be dish shaped. Adjacent the flanges 24, the fingers 22 are formed in their radial edges with part-circular recesses 26 which, when the fingers are assembled to produce the plate define circular apertures registering with radial slots 30 defined between the fingers 22 and serving to permit spot welds 28 to be made between front and rear sheets or membranes 32 and 34 respectively. The axial flange provided on the assembled deflecting plate as a result of the provision of the flanges 24 on the radial fingers 22 constitutes a cylindrical platform for supporting the outer annulus of an elastic diaphragm (not shown), the radial portion of which is intended to be supported by the remainder of the deflecting plate.

FIG. 5 shows an embodiment of the invention in which radial fingers 36 are directly bonded to each side of a single flexible membrane 38 and define slots 40 between them. Within the slots 40, the membrane is formed with radial pleats 42 for ensuring that the membrane is not severely stressed when the plate is deformed.

It will, of course, be appreciated that this latter construction may be modified by directly bonding radial fingers to one side only of a membrane, and providing pleats in the slots formed between adjacent pairs of fingers.

A further embodiment of the invention, shown in FIGS. 6 and 7 is made of sheet metal and comprises a cylindrical outer sleeve portion 52 having a radially inclined lip 54 at one end. The lip 54 is provided with a plurality of regularly circularly distributed tabs or lugs 56 to each of which is centrally spot welded a segmental radial finger 58, the relative rigidities of the fingers 58 and the tabs 56 being such that deflection of the plate takes place about the tabs.

All the embodiments of the invention herein described thus provide a deflecting plate, the deformation of which is permitted by a flexing movement relative to one another of a plurality of radial fingers carried by a common support means. Although in the manufacture of the plate, the radial fingers may be individually produced and assembled where expedient, they are preferably formed by slotting an initially circular plate which is left with an axial disc, hub or flange portion until the circumferential and radial positions of the fingers have been secured, the disc or hub then being removed to produce a central, axial opening in the plate.

In the servomotor or booster shown in FIG. 8, a housing generally designated by the reference numeral 50 is made up of two cylindrical, cupped parts 52 and 54 which are peripherally formed with outwardly directed flanges 56 including opposed bead portions 58 between which is clamped the outer peripheral edge of a cylindrical elastic diaphragm 60 serving to divide the interior of the housing 50 into two fluid chambers 62 and 64. Intermediate its inner and outer edges, the elastic diaphragm 60 is formed with a thickened annular abutment 66 which bears against an inwardly stepped part of the end wall of the housing part 54, whilst radial support for the diaphragm is provided by a deflecting plate 68 which may be of any of the constructions illustrated in FIGS. 1 to 7.

Axially of its end wall, the housing part 54 has a rearwardly extending, stepped annular flange within which is arranged a valve means generally designated 70 and which controls communication of the chamber 64 either with the chamber 62 or with the atmosphere. The chamber 62 is normally connected to a vacuum source (not shown) through a vacuum connection 72, and atmospheric air is admitted to the housing through an air filter 74. Thus, when the valve means 70 is operated to admit atmospheric air to the chamber 64 and to isolate that chamber from the chamber 62, a pressure differential is created between the two chambers and acts to displace the diaphragm 60 to the left in FIG. 8, and the diaphragm in turn displaces an output rod 76 through a dished plate 78 resiliently urged against the deflecting plate 68. In general, save for the inclusion of the deflecting plate 68, the operation of a servo motor as described is well known and need not be further described in relation to the present invention.

We claim:

1. In a differential pressure operated booster for a vehicle braking system, a deflecting plate comprising a plurality of rigid individual fingers and support means for carrying said fingers in mutually flexing relation and for simultaneously maintaining said fingers in regularly circularly spaced and radially fixed locations thereby to define a radially slotted annular plate, wherein the support means comprises a pair of sheets of plastic material laid against one another and formed at regular angular spacing with radial welds defining pockets in said sheets for receiving and locating said fingers which are thereby sandwiched between said sheets.

2. A deflecting plate as set forth in claim 1, wherein said welds are shorter than the radial length of said sheets thereby to define in said pockets, open mouths facilitating insertion of said fingers in said pockets.

3. A deflecting plate as set forth in claim 1, further comprising a quasi-barbed head at one end of each finger, the remainder of said finger having an outwardly divergent shape in a direction towards its opposite end to cooperate with said head in retaining said finger in its pocket in said sheets.

4. In a differential pressure operated booster for a vehicle braking system, a deflecting plate comprising a plurality of rigid individual fingers and support means for carrying said fingers in mutually flexing relation and for simultaneously maintaining said fingers in regularly circularly spaced and radially fixed location thereby to define a radially slotted annular plate wherein each finger is cut away along each longer edge, said cut away regions in adjacent fingers in the deflecting plate defining generally circular areas therebetween and wherein the support means comprises two sheets of plastic material between which the fingers are sandwiched, said sheets being welded together at regular angular spacing in said circular areas between adjacent fingers, said welds serving both to join the two sheets and circularly space apart and radially locate the fingers.

5. A servomotor for a vehicle braking system comprising a housing, a movable wall within and internally dividing said housing into a pair of contiguous fluid chambers, valve means in said housing for establishing differential fluid pressures in said chambers thereby to effect displacement of said movable wall within said housing and a deflecting plate for supporting said movable wall, comprising a plurality of rigid individual fingers and support means for carrying said fingers in mutually flexing relation and for simultaneously maintaining said fingers in regularly circularly spaced and radially fixed location thereby to define a radially slotted annular plate, wherein the support means comprises a pair of sheets of plastic material laid against one another and formed at regular angular spacing with radial welds defining pockets in said sheets for receiving and locating said fingers which are thereby sandwiched between said sheets.

6. A servomotor for a vehicle braking system comprising a housing, a movable wall within and internally dividing said housing into a pair of contiguous fluid chambers, valve means in said housing for establishing differential fluid pressures in said chambers thereby to effect displacement of said movable wall within said housing and a deflecting plate for supporting said movable wall, comprising a plurality of rigid individual fingers and support means for carrying said fingers in mutually flexing relation and for simultaneously maintaining said fingers in regularly circularly spaced and radially fixed location thereby to define a radially slotted annular plate wherein each finger is cut away along each longer edge, said cut away regions in adjacent fingers in the deflecting plate defining generally circular areas therebetween and wherein the support means comprises two sheets of plastic material between which the fingers are sandwiched, said sheets being welded together at regular angular spacing in said circular areas between adjacent fingers, said welds serving both to join the two sheets and circularly space apart and radially locate the fingers.

References Cited

UNITED STATES PATENTS

| | | | |
|---|---|---|---|
| 2,894,490 | 7/1959 | Ingres | 91—369 |
| 2,900,962 | 8/1959 | Ingres | 91—369 |
| 2,949,892 | 8/1960 | Ayers | 92—99 X |
| 3,013,792 | 12/1961 | Steinlein | 267—1 |
| 3,033,173 | 5/1962 | Bauman | 91—369 |
| 3,072,106 | 1/1963 | Randol | 91—369 |
| 3,183,789 | 5/1965 | Stelzer | 92—99 X |
| 3,298,285 | 1/1967 | Webb | 92—98 X |

FOREIGN PATENTS

| | | |
|---|---|---|
| 457,925 | 3/1928 | Germany. |
| 337,309 | 3/1936 | Italy. |

MARTIN P. SCHWADRON, *Primary Examiner.*

EDGAR W. GEOGHEGAN, *Examiner.*

I. C. COHEN, *Assistant Examiner.*